United States Patent [19]

Endo et al.

[11]  4,414,124

[45]  Nov. 8, 1983

[54] METHOD OF PRODUCING BARIUM-FERRITE SERIES POWDER

[75] Inventors: Hiroshi Endo; Masashi Awa; Shigeo Iiri, all of Yokohama; Toshihiko Oguchi, Kawasaki; Isao Suzuki, Yokosuka; Naoyuki Hirate; Masaru Hayashi, both of Yokohama, all of Japan

[73] Assignee: Tokyo Shibaura Denki Kabushiki Kaisha, Kawasaki, Japan

[21] Appl. No.: 250,555

[22] Filed: Apr. 3, 1981

[30] Foreign Application Priority Data

May 8, 1980 [JP] Japan .................................. 55-59943

[51] Int. Cl.$^3$ ............................................. C04B 35/26
[52] U.S. Cl. .............................. 252/62.63; 252/62.56; 252/62.58; 252/62.59; 252/62.6; 252/62.62; 423/594
[58] Field of Search ..................... 423/594; 252/62.56, 252/62.58, 62.59, 62.6, 62.62, 62.63

[56] References Cited

U.S. PATENT DOCUMENTS 3,634,254  1/1972  Micheli ............................. 252/62.63
4,025,449  5/1977  Pezzoli et al. .................. 423/594 X

FOREIGN PATENT DOCUMENTS 46-3545  1/1971  Japan .

Primary Examiner—Jack Cooper
Attorney, Agent, or Firm—Oblon, Fisher, Spivak, McClelland & Maier

[57]  ABSTRACT

Barium-ferrite series powders are prepared from an alkaline aqueous solution containing a prescribed ratio of ions of the metals equal to those contained in the powder. In the first stage, the alkaline aqueous solution is heated at a constant volume at 150° to 300° C. to precipitate a precursor of the barium-ferrite series powder. Then, the precursor is baked at 700° to 1,000° C. to crystallize the precursor.

13 Claims, 5 Drawing Figures

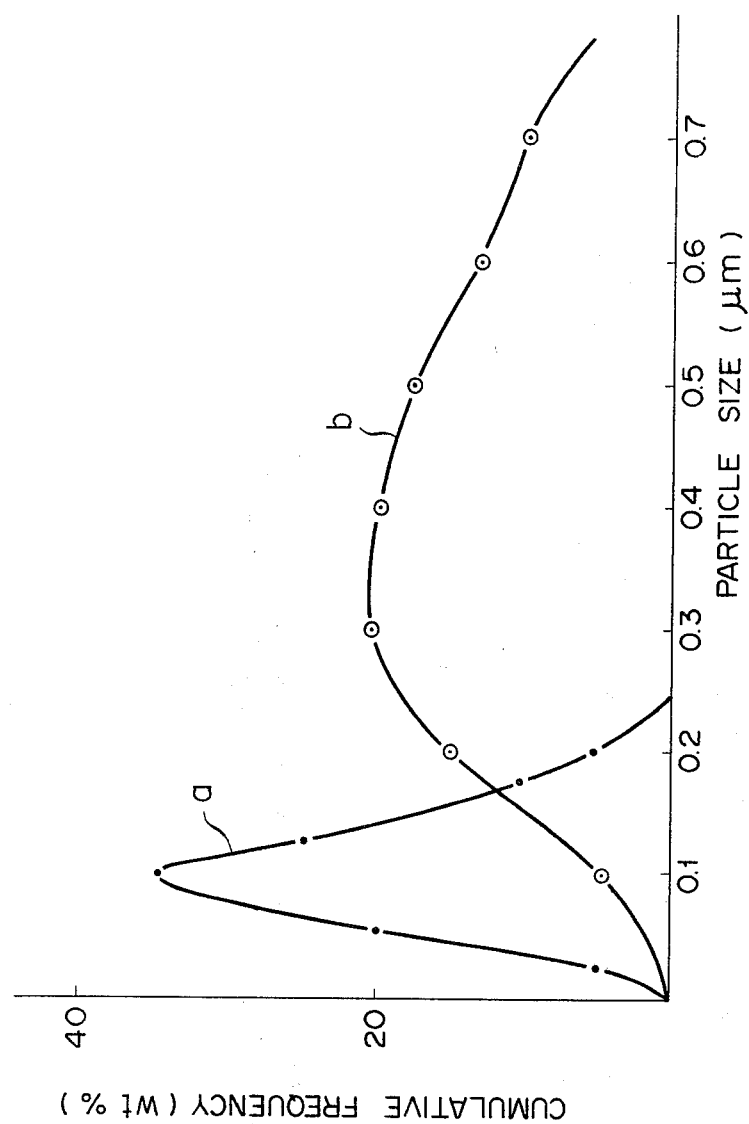
F I G. 5

METHOD OF PRODUCING BARIUM-FERRITE SERIES POWDER

This invention relates to a method of producing barium-ferrite series powders, and more particularly to a method of producing barium-ferrite series microcrystalline powders suitable for use in magnetic recording.

Barium-ferrite powder is widely used as, for example, a recording medium of a recording tape, magnetic recording-reproducing device, etc. or for forming a permanent magnet, memory device, etc. The barium-ferrite powder used in these fields should be high in crystallinity, small in particle size, e.g., 0.5 μm or less, and narrow in particle size distribution in the light of the required magnetic properties of the powder.

Two methods of producing barium-ferrite powder are known in this field. One of the prior arts is a so-called "hydrothermal synthesis" consisting of heating an aqueous solution containing barium ions and iron ions and having a pH value of 8 or more within an autoclave for producing the desired powder. However, the produced barium-ferrite powder contains particles having a size as large as several microns. In other words, this prior art fails to provide a microcrystalline barium-ferrite powder consisting of uniform particles having a size of 0.5 μm or less.

In the other prior art, the barium ions and iron ions contained in an aqueous solution are precipitated at a pH value of 8 or more under room temperature and atmospheric pressure, followed by baking the precipitates at 900° C. or more. It should be noted that the precipitates obtained in the first step is a simple mixture of the components of the barium-ferrite. Further, fine particles of the precipitate are sintered to each other in the subsequent baking step, with the result that it is difficult to obtain a microcrystalline barium-ferrite powder having a narrow particle size distribution.

An object of the present invention is to provide a method of producing by relatively simple operations a barium-ferrite series powder as small in particle size as 0.5 μm or less, narrow in particle size distribution, and high in crystallinity.

According to this invention, there is provided a method of producing a barium-ferrite series microcrystalline powder having a general formula (A):

$$BaO.n(Fe_{1-m}M_m)_2O_3 \quad (A)$$

where
M is at least one substituent component selected from the group consisting of Co, Ti, Ni, Mn, Cu, Zn, In, Ge and Nb,
m is 0 to 0.2, and
n is 5.4 to 6.0.

The method comprises two stages. In the first stage, an alkaline aqueous solution having an alkalinity of 0.01 normal (N) or more and containing barium ions, iron (III) ions and, as required, ions of the substituent component M in amounts sufficient to provide the barium-ferrite of formula (A) is heated at 150° to 300° C. at a constant volume to precipitate the precursor of barium-ferrite. In the second stage, the precipitated precursor is baked at 700° to 1,000° C.

The barium-ferrite series powder produced by the method of this invention is small in particle size (0.5 μm or less), narrow in particle size distribution, and high in crystallinity. Thus, the powder exhibits satisfactory magnetic properties and is suitable for use as, particularly, a magnetic recording medium.

The method of this invention will be described in detail with reference to the accompanying drawings, in which:

FIG. 5 shows a particle size distribution of the barium-ferrite series crystalline powder produced by the method of this invention in comparison with that of the powder produced by the conventional hydrothermal synthesis.

Figure 1:
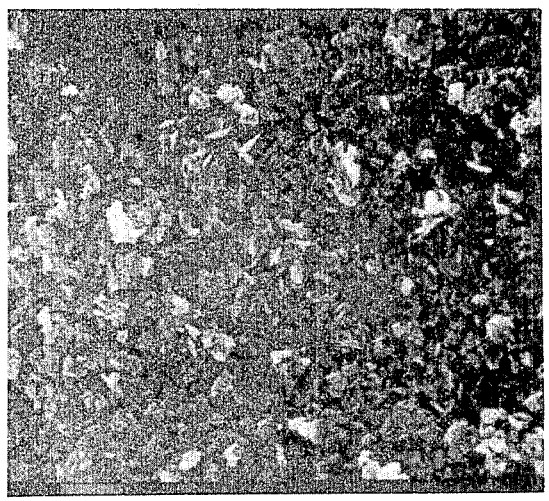
FIG. 1 is a scanning electron micrograph of a barium-ferrite series precursor obtained in the first stage of the method of this invention.

As described previously, the method of this invention produces barium-ferrite series powder having a composition of formula (A). If the formula (A) is not satisfied, a barium-ferrite series microcrystalline powder having a uniform particle size and suitable for providing a magnetic recording medium is unlikely to be obtained. The substituent component M included in the formula (A) serves to decrease the coercive force of the barium-ferrite to a level suitable for the head of an ordinary magnetic recording apparatus. Specifically, the barium-ferrite has a coercive force (iHc) of at least 3,000 oersteds. But, the presence of the substituent component M permits decreasing the value to 500 to 1,500 oersteds, which is suitable for the head of an ordinary magnetic recording apparatus. Preferably, cobalt should be used singly or in combination with the other metal or metals as the substituent component M.

The method of this invention comprises a first stage of heating an alkaline aqueous solution having an alkalinity of at least 0.01 N and containing barium ions, iron (III) ions and, as required, ions of the substituent component M in desired amounts. The metal ions contained in the aqueous solution are supplied by water-soluble compounds of the corresponding metals. The water-soluble metal compounds mentioned include, for example, nitrates such as barium nitrate ($Ba(NO_3)_2$), ferric nitrate ($Fe(NO_3)_3$), cobalt nitrate ($Co(NO_3)_2$), titanium nitrate ($Ti(NO_3)_4$), nickel nitrate ($Ni(NO_3)_2$), manganese nitrate ($Mn(NO_3)_2$), copper nitrate ($Cu(NO_3)_2$), zinc nitrate ($Zn(NO_3)_2$), indium nitrate ($In(NO_3)_3$), germanium nitrate ($Ge(NO_3)_2$) and niobium nitrate ($Nb(NO_3)_2$); perchlorates such as barium perchlorate ($Ba(ClO_4)_2$), ferric perchlorate ($Fe(ClO_4)_2$, cobalt perchlorate ($Co(ClO_4)_2$), titanium perchlorate ($Ti(ClO_4)_4$), nickel perchlorate ($Ni(ClO_4)_2$), manganese perchlorate ($Mn(ClO_4)_2$), copper perchlorate ($Cu(ClO_4)_2$), zinc perchlorate ($Zn(ClO_4)_2$) and indium perchlorate ($In(ClO_4)_3$); chlorates such as barium chlorate ($Ba(ClO_3)_2$), ferric chlorate ($Fe(ClO_3)_3$), cobalt chlorate ($Co(ClO_3)_2$), nickel chlorate ($Ni(ClO_3)_2$), copper chlorate ($Cu(ClO_3)_2$) and zinc chlorate ($Zn(ClO_3)_2$); chlorides such as barium chloride ($BaCl_2$), ferric chloride ($FeCl_3$), cobalt chloride ($CoCl_2$), titanium chloride ($TiCl_4$), nickel chloride ($NiCl_2$), cupric chloride ($CuCl_2$), manganese chloride ($MnCl_2$), zinc chloride ($ZnCl_2$) and indium chloride ($InCl_3$); fluorides such as ferric fluoride (FeF$_3$), cobalt fluoride (CoF$_2$), titanium fluoride (TiF$_4$), cupric fluoride (CuF$_2$), germanium fluoride (GeF$_2$) and niobium fluoride (NbF$_5$); acetates such as barium acetate (Ba(C$_2$H$_3$O$_2$)$_2$), ferric acetate (Fe(C$_2$H$_3$O$_2$)$_3$), cobalt acetate (Co(C$_2$H$_3$O$_2$)$_2$, nickel acetate (Ni(C$_2$H$_3$O$_2$)$_2$), manganese acetate (Mn(C$_2$H$_3$O$_2$)$_2$) and zinc acetate (Zn(C$_2$H$_3$O$_2$)$_2$); and sulfates such as cobalt sulfate (CoSO$_4$), titanium sulfate (Ti(SO$_4$)$_2$), nickel sulfate (NiSO$_4$), manganese sulfate (MnSO$_4$), zinc sulfate (ZnSO$_4$) and indium sulfate (In$_2$(SO$_4$)$_3$).

In this invention, the aqueous solution of the metal compound should contain an alkaline compound in a concentration of at least 0.01 N (which corresponds to a pH value of 12). If the pH value of the solution is lower than 12, it is difficult to obtain barium-ferrite powder having a small particle size (0.05 to 0.5 μm). Preferably, the alkaline compound should be contained in the solution in a concentration of 1 to 6 N. Particularly, where it is intended to obtain a fine powder having an average particle size of 0.1 μm or less, the concentration mentioned should range between 3 N to 6 N. A strong alkali such as sodium hydroxide, potassium hydroxide or lithium hydroxide is used in this invention to provide the desire alkalinity in the aqueous solution.

Any suitable method can be employed for preparing the alkaline aqueous solution mentioned above, though it is convenient to prepare aqueous solutions each containing a desired metal compound, followed by mixing the aqueous solutions prepared first and subsequently adding the mixture to a strong alkaline aqueous solution containing a prescribed amount of the alkaline compound. In order to suppress heat generation, it is desirable to cool the mixture of the metal compound solutions to about 20° C. or less before the mixture is added to the alkaline solution. If the heat generation is suppressed in adding the mixture of the metal compound solutions to the alkaline solution, the precipitates obtained in the subsequent heating step is allowed to consist of particles of more uniform size.

The alkaline aqueous solution containing the metal ions is heated at 150° to 300° C. at a constant volume. If the heating temperature does not fall within the range mentioned above, it is difficult to obtain a desired barium-ferrite powder of uniform particle size. It is desirable to use an autoclave in the heating step. Also, the heating temperature should desirably range between 180° C. and 250° C. In general, the heating is continued for about 20 minutes to 2 hours.

The heating permits precipitating a precursor of barium-ferrite powder, said precursor containing metals at a ratio substantially equal to that of the metal ions contained in the alkaline solution. In other words, the ratio of the metal ions contained in the alkaline solution should be controlled to meet the ratio of the metals included in formula (A), i.e., the ratio of [Ba]:-[Fe]:[M] = 1:2n(1−m):2nm.

The precursor obtained by the heating is not a simple mixture of the components, but is substantially equal to the final product of barium-ferrite microcrystalline powder in chemical structure. To be more specific, the precursor already bears a desired crystal contour. However, since the crystallization is not completed, the precursor is very low in coercive force (iHc) and saturated magnetization (Ms). FIG. 1 is a scanning electron micrograph (magnification of 10,000) showing an example of the precursor.

After water-washed and dried, the precursor is baked at 700° to 1,000° C. in the second stage of this invention. The baking permits the precursor to be crystallized completely so as to provide a barium-ferrite series crystalline powder consisting of regular hexagonal plate-shaped microcrystals. It should be noted that the crystallization proceeds in the baking step, with the particle size, of the baked precursor being diminished. In other words, there can be obtained fine particles having a particle size, i.e., distance between two parallel sides of the hexagon, of 0.05 to 0.5 μm and a narrow particle size distribution. If the baking temperature is lower than 700° C., the crystallization does not proceed satisfactorily or the baked powder fails to exhibit desired magnetic properties. Preferably, the baking temperature should range between 850° C. and 950° C. The baking is conducted for a period of time sufficient to complete the crystallization of the precursor and is usually carried out for about 1 hour (or more).

It is desirable to keep the precursor floated in the baking step. To this end, a rotary kiln or baking furnace of fluidized bed type is used in the baking step.

Figure 2:
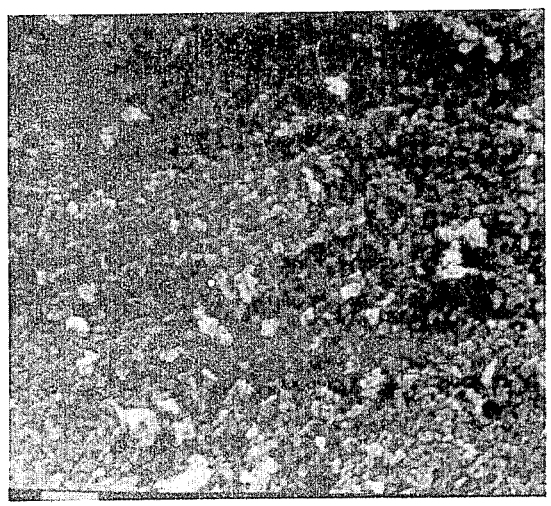
FIG. 2 is a scanning electron micrograph of a barium-ferrite series powder obtained by baking the precursor shown in FIG. 1 in the second stage of the method of this invention.
Figure 3:
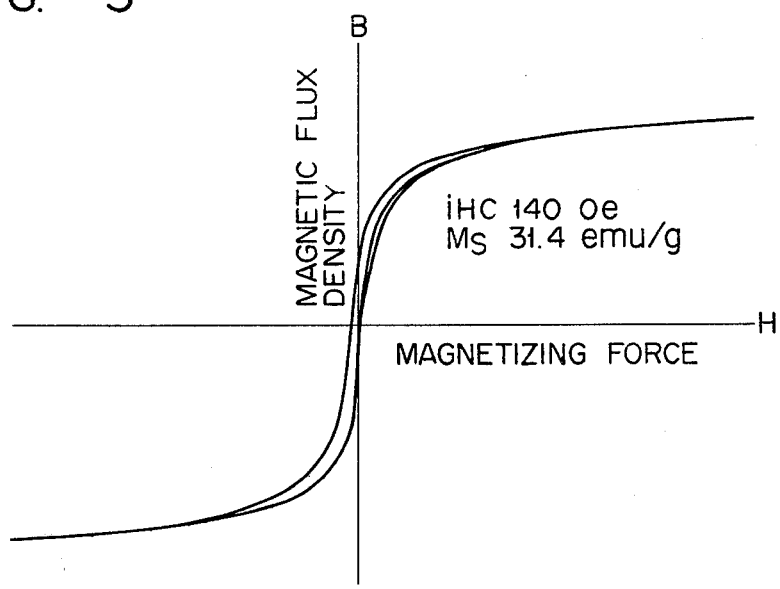
FIG. 3 shows a magnetization curve of the precursor mentioned above.
Figure 4:
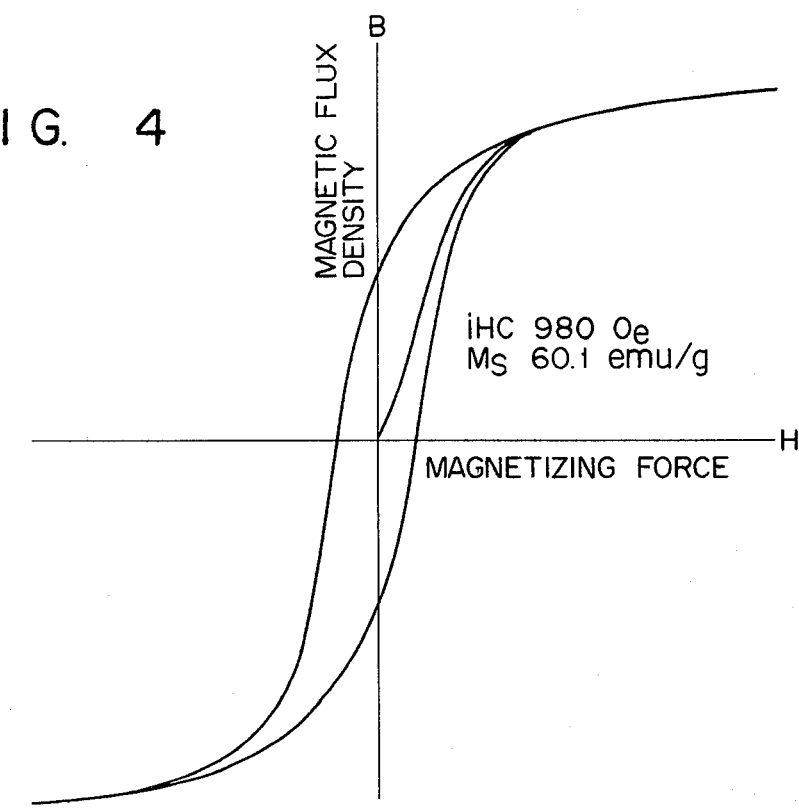
FIG. 4 shows a magnetization curve of the barium-ferrite series crystalline powder produced by the method of this invention.

FIG. 2 is a scanning electron micrograph (magnification of 10,000) showing an example of barium-ferrite series crystalline powder obtained after the baking step. As seen from comparison between FIGS. 1 and 2, the baked powder is diminished compared to the precursor in the size of the particle, and the surface of the precursor is more coarse than that of the baked powder. What makes the baked powder decisively different from the precursor is the magnetic properties. FIGS. 3 and 4 show magnetization curves, i.e., so-called "B-H curves", of the precursor and baked powder, respectively. It is seen from FIG. 3 that the precursor scarcely exhibits a permanent magnetization property, whereas FIG. 4 substantiates that the baked powder sufficiently exhibits a permanent magnetization property. The difference in magnetic properties between the two can also be seen from completeness of the microcrystals, e.g., half value width in X-ray diffraction analysis. Specifically, the half value width of the baked powder is very small as compared to that of the precursor: for example, the half value width for (006) plane of the crystal of the baked powder is ½ to ¼ of that of the precursor.

To be brief, the baking treatment in the second stage permits the precursor to be crystallized completely so as to produce a barium-ferrite series microcrystalline powder having desired values of coercive force (iHc) and saturated magnetization (Ms). It is important to note that sintering or reaction does not take place among the particles of the precursor in the baking step.

EXAMPLE 1

A mixture consisting of 1,000 ml of an aqueous solution containing 2.0 mols/l (M) of FeCl$_2$, 210 ml of an aqueous solution containing 1.0 M of BaCl$_2$, 154 ml of an aqueous solution containing 1.0 M of CoCl$_2$ and 154 ml of an aqueous solution containing 1.0 M of TiCl$_4$ was cooled to a temperature lower than 20° C., followed by adding the cooled mixture to 1,000 ml of an aqueous solution containing 10 M of NaOH to prepare an aqueous solution exhibiting a pH value of 13 and containing brown precipitates. The resultant aqueous solution was put in an autoclave and heated to 200° C. for 1 hour to precipitate a precursor of powder having a chemical composition of BaO.6(Fe$_{0.86}$Co$_{0.07}$Ti$_{0.07}$)$_2$O$_3$. The precursor was water-washed and, then, dried, followed by baking the dried precursor at 900° C. for 45 minutes in a rotary kiln to obtain a barium-ferrite series hexagonal microcrystalline powder exhibiting a ferromagnetic property.

The baked powder was found to consist of regular hexagonal plate-shaped microcrystals having a diameter-to-thickness ratio of at least 10, i.e., ratio of distance between two opposite corners of hexagon with respect to the center of the hexagon to the thickness of the hexagonal plate. Also, the particle size, i.e., distance between two parallel sides of hexagon, of the baked powder was found to fall within the range of 0.1 to 0.3 μm.

The operations described above were repeated several times to obtain several lots of barium-ferrite microcrystalline powder. No substantial difference was recognized in magnetic property and particle size distribution among the lots of produced powder.

Additional experiments were conduced as in Example 1 except that Co and Ti included in the crystal were replaced by Mn, Zn and/or In, with substantially the same result.

FIG. 5 shows the particle size distribution of the barium-ferrite series microcrystalline powder obtained in Example 1 in comparison with that of the powder produced by the conventional hydrothermal synthesis. Curves a and b shown in FIG. 5 represent the present invention and the prior art, respectively. It is clearly seen that the powder produced by the method of this invention is markedly narrower in the particle size distribution than the powder produced by the conventional method.

EXAMPLE 2

A mixture consisting of 1,000 ml of an aqueous solution containing 2.0 M of $FeCl_3$ and 160 ml of an aqueous solution containing 1.0 M of $BaCl_2$ was cooled to a temperature below 20° C., followed by adding the cooled mixture to 1,000 ml of an aqueous solution containing 10 M of NaOH to prepare a solution exhibiting a pH value of 13 and containing brown precipitates. The solution thus prepared was put in an autoclave and heated at 200° C. for 1 hour to precipitate a precursor of powder having a chemical composition of $BaO.6Fe_2O_3$. The precursor was water-washed and, then, dried, followed by baking the dried precursor at 920° C. for 1 hour in a baking furnace of fluidized bed type so as to obtain a barium-ferrite series hexagonal microcrystalline powder having an average particle size of 0.1 to 0.3 μm.

What we claim is:

1. A method of producing barium-ferrite series microcrystalline powders having a general formula:

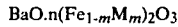

$BaO.n(Fe_{1-m}M_m)_2O_3$ where M is at least one substituent component selected from the group consisting of Co, Ti, Ni, Mn, Cu, Zn, In, Ge and Nb, m is 0 to 0.2, and n is 5.4 to 6.0, comprising:
providing an alkaline aqueous solution having an alkalinity of at least 0.01 N and containing barium ions, iron (III) ions and, optionally ions of the substituent component M dissolved therein in amounts sufficient to provide a molar ratio of $1:2n(1-m):2nm$ in the crystalline powder of said formula by adding a first aqueous solution to a second aqueous solution of an alkali, said first aqueous solution being prepared in advance by dissolving the water-soluble compounds of barium, iron (III) and optionally substituent component M in water;
heating said alkaline aqueous solution at 150° to 300° C. at a constant volume, thereby precipitating a precursor of said crystalline powder, said precursor substantially bearing regular hexagonal plate-shaped crystal contour; and
baking said precursor at 700° to 1,000° C. to completely crystallize the precursor, thereby obtaining the crystalline powder having a particle size of 0.5 μm or less.

2. The method according to claim 1, wherein the barium ions, iron (III) ions and ions of the substituent component M are provided by water-soluble compounds of barium, iron (III) and substituent component M.

3. The method according to claim 2, wherein the water-soluble compounds are selected from the group consisting of nitrates, perchlorates, chlorates, chlorides, fluorides, acetates and sulfates.

4. The method according to claim 1, wherein the alkalinity of the aqueous solution is provided by a strong alkali.

5. The method according to claim 4, wherein the strong alkali is selected from the group consisting of sodium hydroxide, potassium hydroxide and lithium hydroxide.

6. The method according to claim 1, wherein the first aqueous solution is cooled to 20° C. or less and, then, added to the aqueous solution of the alkali.

7. The method according to claim 1, 4 or 6, wherein the alkaline aqueous solution has an alkalinity of 1 to 6 N.

8. The method according to claim 7, wherein the normality N ranges between 3 and 6.

9. The method according to claim 1, wherein the heating of the alkaline aqueous solution falls within the range of between 180° C. and 250° C.

10. The method according to claim 1 or 9, wherein the alkaline aqueous solution is heated in an autoclave.

11. The method according to claim 1, wherein the baking temperature is within the range of between 850° C. and 950° C.

12. The method according to claim 1 or 11, wherein the precursor particles are kept floated in the baking step.

13. The method according to claim 12, wherein the precursor is baked in a rotary kiln or baking furnace of fluidized bed type.

* * * * *